Jan. 30, 1968     C. P. GRAHAM     3,366,138
VALVE MEANS
Filed Sept. 15, 1964
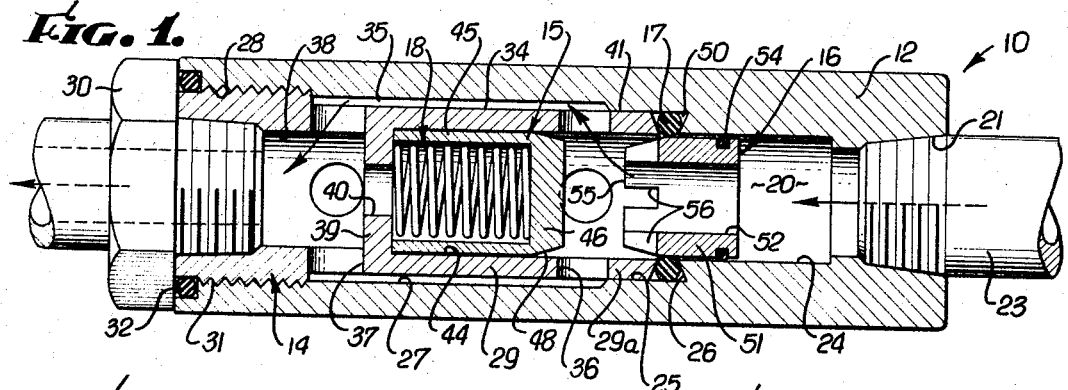
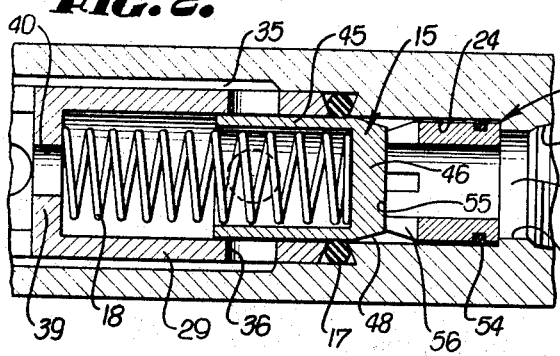   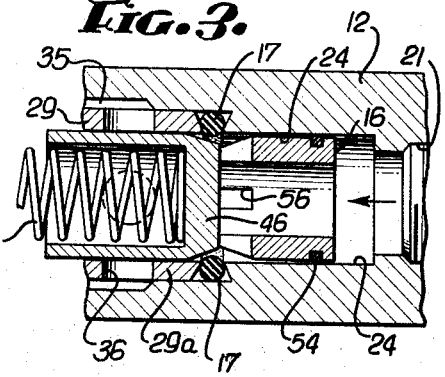
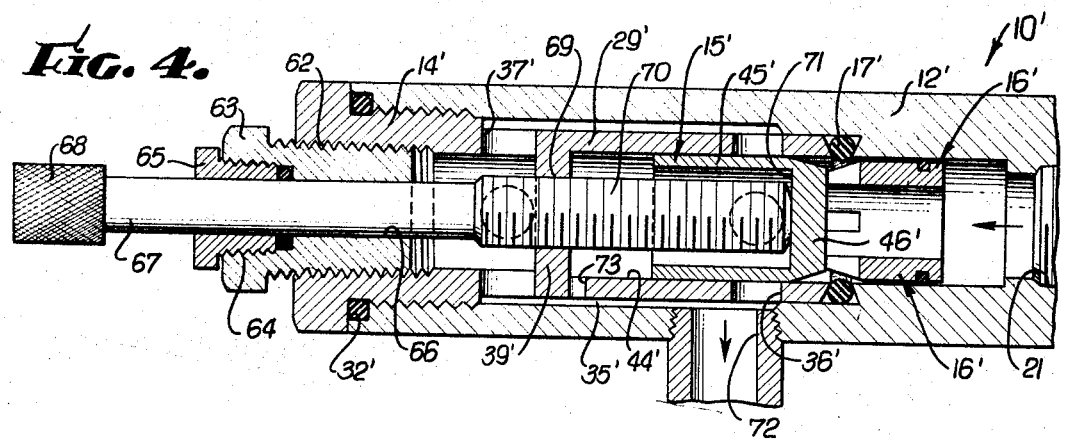
INVENTOR.
CLIFFORD P. GRAHAM
BY Miketta & Glenny
ATTORNEYS.

United States Patent Office 3,366,138
Patented Jan. 30, 1968

3,366,138
VALVE MEANS
Clifford P. Graham, 11595 Morrison St.,
North Hollywood, Calif. 91601
Filed Sept. 15, 1964, Ser. No. 397,072
4 Claims. (Cl. 137—538)

ABSTRACT OF THE DISCLOSURE

A piston-type valve construction having a valve housing with a stepped valve chamber in which a tubular member is concentrically disposed in annular spaced relationship to the housing. Longitudinally spaced ports in the tubular member communicate with the valve chamber and inlet and outlet valve openings. A piston member movable in a piston chamber in the tubular member is movable over one of the ports to open and close the valve. A follower element is movable in one of the chamber stepped portions in association with the movement of the piston member whereby the piston and follower element cooperate to cover a sealing O-ring to protect the ring from fluid flow.

This invention relates to a valve means and more particularly to a piston-type valve means embodying a novel construction and operation adaptable for multi-purpose use in high and low fluid pressure systems, in valve arrangements including check valves, manually operated normally open or normally closed valves, and in combinations of two or more piston valve means to provide three or four way valve arrangements in various valving systems.

Prior proposed piston-type valve devices have been subject to several disadvantages including deterioration of sealing surfaces because of abrasive action of fluid passing thereover in valve open position when foreign particles, such as sand, was carried by the fluid; lack of adequate protection of sealing rings during opening and closing of the valve device; and lack of a suitable arrangement of valve parts whereby sealing surfaces were self-cleaning. Such prior proposed valve devices were usually designed and adapted for a particular valve use or purpose and were not constructed so as to be readily adapted to other purposes or used in combination with a like valve device to provide flexibility of operation, installation, and adaptability to various valve systems.

The present invention relates to a valve means of piston-type in which essential parts of the valve means are constructed and arranged so that a novel method of operation with attendant numerous advantages are achieved and the disadvantages of prior proposed piston-type valve devices are obviated.

An object of this invention is to disclose and provide a piston-type valve means of simple effective construction and operation.

Another object of this invention is to disclose and provide a piston-type valve means wherein surfaces at which the seal is made are self-cleaning.

Another object of this invention is to disclose and provide a piston-type valve means which employs an O-ring for sealing against a piston surface and wherein the O-ring is protected during flow of fluid and during opening and closing of the valve means.

Another object of the invention is to disclose and provide a valve means readily adapted to be combined with one or more similar valve means to provide a simple effective valving system for a variety of fluid flow arrangements.

A still further object of the invention is to disclose and provide a piston-type valve means wherein a piston is movable within a piston chamber which is located within a annular concentric chamber so arranged with respect to the inlet and outlet openings of the valve means that flow of fluid bypasses the piston for protection of surfaces of the piston.

A further object of the invention is to provide a valve means having a valve body member with an inlet and outlet opening and a valve chamber therebetween, a tubular member receivable through one of said openings and forming a piston chamber within the valve chamber communicating with both openings, and a piston in said piston chamber cooperable with seal means adjacent one of the openings and movable into valve open or closed positions.

Many other objects and advantages will be readily apparent from the following description of the drawings in which exemplary embodiments of the valve structure embodying the invention are shown.

In the drawings:

FIG. 1 is a sectional view taken in a plane passing through the axis of a valve means embodying this invention and showing the valve means in valve open position.

FIG. 2 is a fragmentary sectional view taken in the same plane as FIG. 1 showing the valve means in valve closed position.

FIG. 3 is a fragmentary sectional view showing the valve means in partially open position.

FIG. 4 is a sectional view of a modification of the valve means shown in FIG. 1 showing a manually operable valve.

In the drawings a valve means, generally indicated at 10, is of piston-type and is of check valve construction for illustrating the novel structure and operation of a valve means embodying the present invention. Valve means 10 may be modified to provide a valve structure operable as a normally closed valve, a normally open valve, a regulating valve, or combined with like valve means to provide various valves for different fluid flow systems as later described.

Valve means 10 generally comprises a valve housing or body member 12, a hollow tubular or sleeve member 14 received within the valve housing 12, a piston member 15 movable within the sleeve member 14, a freely movable follower 16 disposed in the valve housing adjacent one end of the piston member, a seal means 17 cooperable with the piston member and follower 16, and a spring means 18 for biasing the piston member 15 into valve closed position.

The elongated valve body member 12 may be made of suitable metal or rigid material resistant to the particular fluid passing therethrough, and may be provided with an axial through bore having bore sections of different diameter defining an internal body chamber 20 having an inlet opening 21 at one end. Inlet opening 21 may threadedly receive a conduit 23 for conducting fluid to inlet opening 21. The internal body chamber 20 includes a follower bore section 24 of selected diameter or cross-sectional flow area. Centrally of chamber 20 an intermediate seal bore section 25 is provided by a slightly enlarged bore diameter which defines an annular shoulder 26 with section 24. Extending towards the end of valve body member 12 or internal chamber 20 a further enlarged valve chamber portion 27 is provided which terminates in an internally threaded end portion 28 for threaded engagement with external threads 31 on tubular member 14. Tubular member 14 has a head 30 for limiting the inward positioning of member 14. A seal means 32 may be confined in sealing relation between head 30 and the adjacent end of body member 12.

Received within valve chamber portion 27 is a hollow tubular or sleeve portion 29 of member 14 having an inner open end 29a. The tubular portion 29 extends through chamber portion 27 and into the seal bore section 25 to terminate in spaced relation to annular shoulder 26. Tubular portion 29 has an outer cylindrical surface 34 in spaced relation to the internal surface of chamber portion 27 to provide an annular space 35 for flow of fluid therethrough, such space 35 having a flow area at least equivalent to the flow area of inlet opening 21. Tubular portion 29 may be provided with a plurality of circularly spaced ports 36 adjacent its inner open end 29a to provide communication from bore section 24 to annular space 35. Spaced from ports 36 may be a similar arrangement of circularly spaced ports 37 adjacent head 30 of member 14 for communication of fluid from annular space 35 to outlet passageway or opening 38 provided by member 29.

Valve body member 12 thus receives in body chamber 20 and in telescopic relation the tubular member 14 and forms an annular passageway for fluid externally or outwardly of tubular portion 29 for a substantial portion of its length. Portion 29 may be separate from head 30 and may be secured and positioned within valve chamber portion 27 by other suitable means. The present arrangement of valve body member 12 and tubular member 14 provides a separable two-part valve means which is readily constructed and assembled.

In this example, immediately adjacent the bottom ports 37, tubular portion 29 is provided with an internal radially inwardly directed annular flange 39 having a port 40 for communication of fluid into portion 29. The inner open end of portion 29 may be afforded a close fit at 41 to the internal surface of the seal bore section 25.

Piston member 15 is slidably movable within a piston chamber 44 defined by internal cylindrical surfaces of tubular portion 29 above internal flange 39 and extends to the open end of portion 29. Piston member 15 includes a cylindrical skirt or wall 45 and an end wall 46 of somewhat thicker section to close one end of piston member 15. The length of piston 15 is approximately that of the distance between internal flange 39 and the bottom edge of ports 36. Thus, in valve open position bottom annular edge face of cylindrical wall 45 seats against opposed surfaces of internal flange 39. End wall 46 of the piston member may be provided with a taper or bevel surface 48 so that the minimum diameter of the circular face of end wall 46 is at least slightly less than the internal diameter of seal ring 17.

In the exemplary check valve arrangement, piston member 15 may house or enclose within skirt 45 the spring means 18 of coil spring type and of selected strength depending upon the selected pressure at which the valve means is desired to open. Spring means 18 has one end seated on internal flange 39 and its other end seated against end wall 46.

In FIGURE 1, seal ring 17 is carried in an annular groove 50 defined by shoulder 26, the internal walls of seal bore section 25 and the forwardly facing annular edge face of member 29. Shoulder 26 and the edge face of member 29 may diverge outwardly or be inclined so that groove 50 is configured as a dove-tail. Seal ring 17 fitted therein is relatively loosely confined so that some turning or rolling movement of the seal ring about its toroidal axis is permitted during valve operation as later described. The seal ring 17 may be of O-ring type and has an internal diameter which is slightly less than the outer diameter of the cylindrical wall 45 of piston member 15.

In follower bore section 24 is a freely movable follower member 16 which includes an open ended hollow general cylindrical body member 51 provided with a through bore 52 of selected flow area. The cylindrical wall of body member 51 may be provided with an annular recess for enclosing an O-ring type seal 54 for sliding engagement with the internal surfaces of the bore section 24. The inner end portion of follower member 16 may be of generally conical or tapered configuration which terminates in a follower end edge face 55 of slightly less outer diameter than the circular end face of piston member 15. A plurality of circularly arranged axially extending slots 56 in the inner end portion of the follower member provides a flow area at least equivalent to the flow area of bore 52. Follower member 16 is freely movable in the follower section 24 in response to fluid pressure.

In operation of the exemplary valve means 10 of check valve type, the piston member 15 is in valve closed position (FIG. 2) when the line pressure from the inlet 21 is less than the spring loading of the spring means 18. In such closed position, follower member 16 is located in follower bore section 24 and may be seated on end wall 46 of the piston member 15. End wall 46 is located slightly beyond seal ring 17 and sealing engagement of the seal ring occurs on the cylindrical surface of skirt 45. Skirt 45 extends over and covers ports 36 in tubular member 14 and thus closes ports 36.

As line pressure exceeds spring loading of spring means 18, piston member 15 is moved against the spring means and its tapered nose portion formed by bevel surface 48 moves past seal ring 17 and out of sealing engagement therewith. Since follower member 16 has opposite ends of different area, fluid pressure from inlet opening 21 will normally move follower member 16 towards piston member 15. Also, since piston member 15 has a circular end face on wall 46 of an area greater than the largest area of the follower member 16, it will be apparent that piston member 15 will separate from follower member 16 during movement to valve open position. In such movement, sealing engagement of piston member 15 with seal ring 17 is first broken by passage of the conical or nose portion formed by the beveled face 48 on end wall 46 passing seal ring 17. Piston member 15 moves away from the follower member 16 until edges of cylindrical wall 45 seat on internal flange 39 and the end face of wall 46 lies approximately opposite the downstream portion of ports 36. In this fully open position, piston member 15 has compressed spring means 18.

Flow of fluid thus passes through follower bore section 24, through bore 52 of follower member 16, slots 56 of the follower member, through ports 36 and into annular space 35 for discharge through ports 37 and thence through bore 38 of the member 29 and into the discharge conduit. Opening 40 defined by internal flange 39 provides communication to the interior of the piston member 15 and when the inlet fluid pressure drops below the spring loading pressure, piston member 15 will move towards valve closed position.

Under condition of low fluid pressure, follower member 16 may remain spaced from piston member 15 during operation of the valve means 10. Under increased fluid pressure conditions, follower member 16 may move towards piston member 15 in valve open position until the adjacent edge face 55 of follower member 16 seats on end wall 46 of piston member 15.

When fluid pressure conditions change so that fluid pressure at the outlet side of the valve means together with the spring loading of spring means 18 becomes greater than the inlet pressure, piston member 15 will begin to move toward valve closed position. In such movement the tapered nose portion of the piston member first engages the seal ring 17 and as the nose portion progresses through seal ring 17, the ring is caused to expand the roll upon the tapered surface 48 until seal ring 17 has sealing engagement with the adjacent cylindrical surface of wall 45 of piston member 15 adjacent the nose portion. During such movement to valve closed position, follower member 16 also moves in the same direction in contact with end wall 46. Seal ring 17 is thus protected from flow of fluid during closure of the valve means at all times except while slots 56 pass seal ring 17.

Protection of seal ring 17 from flow of fluid is thus virtually complete during both opening and closing of valve means 10. Since piston member 15 slidably moves in the piston chamber 44 provided by the tubular member 29, the cylindrical surfaces of piston member 15 are also substantially protected from flow of fluid. The freely movable follower 16 while initially being separated from piston member 15 during opening of the valve means, will always tend to follow the piston member 15 because of the differential in pressure area provided at opposite ends of follower member 16.

In FIGURE 4, the structure of valve means 10 has been modified to provide for a screw-type hand operated normally open valve means. Like parts will be indicated by like reference numerals with a prime sign.

In FIGURE 4, valve means 10' includes a valve body member 12', a hollow tubular member 14', a piston member 15', a freely movable follower 16', a seal means 17', all of such parts being arranged in a manner similar to that described above. In this example, the tubular member 14' is modified so as to provide a threaded connection at 62 for a fitting 63 which may receive in threaded engagement at 64 a bushing 65. Bushing 65 and fitting 63 provide an axially aligned bore generally indicated at 66 for reception of a shaft 67 of a valve operating means. Shaft 67 carries at its outer end a knurled knob 68 for turning shaft 67. Shaft 67 extends into hollow tubular member 14', pass ports 37' and into threaded engagement at 69 with internal margins of flange 39'. Spring means 18 has been omitted and a threaded inner portion 70 of shaft 67 extends into the cylindrical wall 45' of piston member 15'. The inner end of threaded portion 70 of shaft 67 may abut at 71 the inner face of end wall 46'.

In this example, an outlet opening 72 is provided in the wall of valve body member 12' in communication with space 35' and adjacent ports 36' of tubular portion 29'. Adjacent internal flange 39', cylindrical wall 45' of tubular portion 29' may be provided with a small port 73 to provide fluid communication between space 35' and the piston chamber 44'.

In operation of the modified valve means 10' as shown in FIGURE 4, it will be apparent that fluid entering inlet opening 21' will maintain abutment of piston member 15' with the inner end of shaft 67 at 71. Piston member 15' is not threaded to threaded portion 70 of shaft 67. As shaft 67 is turned so as to move the shaft outwardly from tubular member 14', valve member 15' will move with shaft 67 and will uncover ports 36' as the shaft is retracted. Shaft 67 may be turned until piston member 15' is in fully open position or it may be turned to a partially closed position. Fluid flow from inlet opening 21' through outlet opening 72 may thus be manually regulated to fully open position, fully closed position, or to any degree of partially closed position for regulating flow of fluid. As in the prior embodiment, the arrangement of piston member 15' and follower member 16' protects sealing surfaces on both piston member 15' and seal ring 17'.

It should be noted that the modification of FIGURE 4 which shows a normally open hand operated valve may be readily modified to a hand operated normally closed valve by mounting shaft 67 in similar manner in the inlet opening 21', passing the shaft through follower 16' to abut on end wall 46' of piston member 15'. As a normally closed valve, spring means 17 would be positioned as in the first embodiment so as to bias the piston member to valve closed position and against the end of shaft 67. The position of piston member 15' is regulated by rotation of shaft 67 which may have a threaded connection with one of the fittings provided at opening 21'. It will be understood that the inlet opening for the normally closed valve arrangement may be provided by a side opening in valve body member 12' into the follower bore section 24'. The opposite end of the valve body member would be closed by a suitable plug.

In the above modifications of valve means 10, it will be apparent that the basic arrangement of the several valve parts are employed in virtually the same relationship, that is valve body member 12, hollow tubular member 14, piston member 15 and seal means 17. In each of the modifications, flow of fluid bypasses piston member 15 and only the tapered nose portion of piston member 15 is exposed to fluid. Thus, the sealing surfaces on piston member 15 which engage seal ring 17 are protected from abrasion of fluid. Seal ring 17 is able to roll on the nose portion of piston member 15' and also on the tapered or conical portion of follower member 16, so that seal ring 17 is protected during flow of fluid through the valve means.

It will be understood that various other arrangements of the basic design of the valve means 10 may be employed to achieve any desired valve system in order to provide multi-purpose use of valve means 10.

It will be understood that changes in the structure and operation of valve means 10 and its modifications as shown in FIGURES 4 and 5, may be made which come within the spirit of the present invention and all such modifications and changes coming within the scope of the appended claims are embraced thereby.

I claim:
1. In a valve means the combination of:
   a valve housing defining a longitudinally extended chamber provided with inlet and outlet ports;
   a tubular member positioned within the chamber and defining with the valve housing an annular passageway for flow of fluid between the tubular member and the housing, said tubular member having longitudinally spaced ports leading to said passageway,
      said tubular member having an open end communicating with one of said spaced ports;
   a piston valve member slidable within said tubular member to a valve open position below one of said spaced ports and to a closed position with one end of the piston member extending through said open end and therebeyond;
   a follower element slidable in said chamber adjacent said one end of said piston member and having a through bore,
      said follower having an end with transverse openings adjacent said piston member;
   and seal means comprising a single O-ring loosely retained between an end face on said tubular member and an opposed shoulder on said housing, said O-ring receiving in sealed relation said piston member in valve closed position and receiving said follower member in valve open position.

2. A valve means as stated in claim 1 wherein said one end portion of said piston member has a tapered end, the minimum diameter of said tapered end being less than the diameter of said O-ring and the major diameter of said tapered end being slightly greater than the inner diameter of said O-ring whereby said O-ring is rolled about its annular axis into sealing relation therewith when the piston member moves to valve closed position.

3. A valve means as stated in claim 2 wherein said follower element has a tapered nose provided with transversely arranged slots, the minimum diameter of said tapered nose being less than the minimum diameter of said tapered end on the piston member.

4. A valve means as stated in claim 2 wherein said tubular member includes an internal support means, and a spring means seated on said support means and engaging said piston member for biasing it towards valve closed position.

References Cited

UNITED STATES PATENTS

| | | | |
|---|---|---|---|
| 2,594,626 | 4/1952 | Earle. | |
| 1,814,762 | 7/1931 | Mochel | 251—361 |
| 2,420,370 | 5/1947 | Hamilton | 251—285 X |
| 2,469,921 | 5/1949 | Hoge | 137—625.42 |
| 2,826,216 | 3/1958 | Thomas | 137—538 |

FOREIGN PATENTS 6,152   3/1893   Switzerland.

WILLIAM F. O'DEA, *Primary Examiner.*

D. LAMBERT, *Assistant Examiner.*